June 30, 1970   P. W. VANDERHELST   3,518,395
END WELD CONTROL CIRCUIT

Filed July 3, 1967   2 Sheets-Sheet 1

INVENTOR.
PETER W. VANDERHELST
BY
Woodhams, Blanchard & Flynn
ATTORNEYS

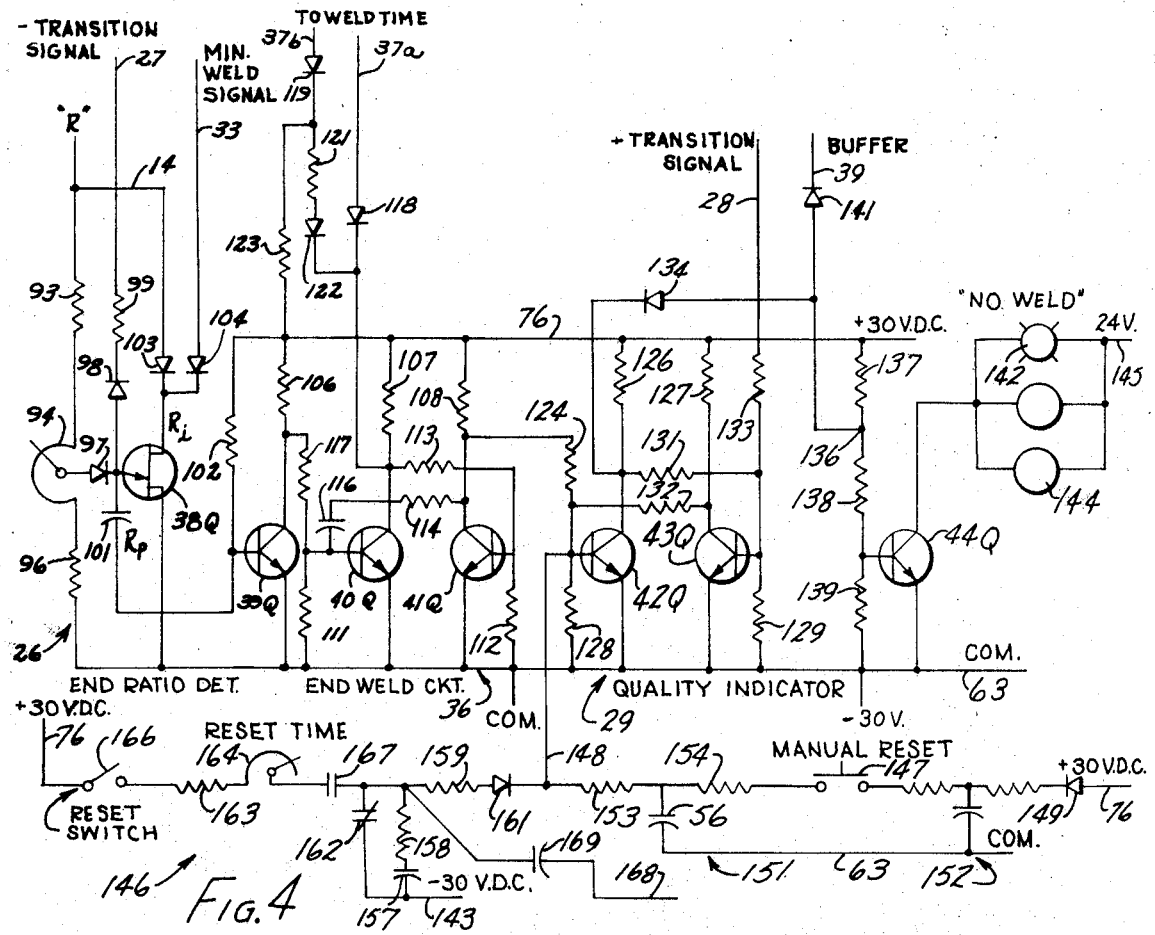

United States Patent Office 3,518,395
Patented June 30, 1970

3,518,395
END WELD CONTROL CIRCUIT
Peter W. Vanderhelst, Livonia, Mich., assignor to Robotron Corporation, Detroit, Mich., a corporation of Michigan
Filed July 3, 1967, Ser. No. 650,789
Int. Cl. B23k 9/10
U.S. Cl. 219—110                              4 Claims

ABSTRACT OF THE DISCLOSURE

A resistance drop welding control circuit includes apparatus operable in conjunction with the weld timer of a resistance welding machine for terminating the weld interval in response to a drop of the welding resistance value to a preselected fraction of its peak value. A buffer circuit driven by the weld timer provides an output during the weld interval. A transition timer energized thereby provides a first transition signal during the initial part welding interval during which resistance irregularities and instabilities are likely to occur and a second transition signal for the remainder of the weld interval. A signal proportional to the instantaneous welding resistance is applied to an end ratio detector. The second transition signal is applied to the end ratio detector to allow it to store the peak value of the resistance signal. After the minimum time normally required to achieve a good weld has passed a minimum weld timer energizes the end ratio detector in synchronism with the alternating power supply to the welding machine to cause the end ratio detector to provide an output upon occurrence of completion of a whole number of cycles of welding current flow and a drop in the instantaneous welding resistance to a preselected fraction of its peak value. An end weld circuit energized by said output thereupon causes the weld timer to terminate the weld interval. A quality indicator responds to termination of the weld interval by the weld timer prior to energization of the end weld circuit to indicate a possible defective weld.

Cross references to related applications:
(1) Application Ser. No. 650,714
(2) Application Ser. No. 650,964

FIELD OF THE INVENTION

This invention relates to a resistance drop feedback welding control and more particularly relates to an apparatus for terminating welding in response to a drop in welding resistance to a preselected fraction of a peak resistance value.

DESCRIPTION OF THE PRIOR ART

It has been known for some time that, in the welding of plain uncoated mild steel, for example, there is a discernible change in the electrical resistance of the workpiece as the weld is made. For the first cycle or two of weld time the resistance is unstable as it is affected by the conditions of the material surfaces and may achieve some instantaneous peaks before settling down. After three cycles or so the surface conditions usually become stable and the resistance normally rises as the temperature of the workpiece rises. On the other hand, in some instances where the material to be welded is not properly fitted together, the welding resistance may fall off spuriously after the first several cycles of welding current flow but before there is any effective weld and then as the fit-up situation changes the weld resistance rises to its normal peak value. At the beginning of normal fusion time, the resistance levels off and begins to drop gradually. It is this resistance drop that is indicative that a weld is being made. There is evidence that the amount of drop is related to nugget size.

Several controls are known which do nothing more than watch resistance under constant current conditions and terminate weld time when the desired resistance drop has occurred. However, these have generally been unstable in use and relatively expensive to produce and operate. Such controls have generally ignored resistance variations early in the weld interval caused by material surface conditions and metal fit-up variations which if uncompensated for can readily cause false peak readings and premature weld termination. Moreover, applicant has found that the widely varying weld timers normally resulting with such circuits can be limited partially by using a maximum timed interval in connection with the resistance drop control and further contemplates coupling suitable heat control means thereto for controlling the characteristic of the resistance drop.

Pat. No. 2,848,595 to Van Sciver, now assigned to the assignee of the present invention, discloses a circuit in which the contact resistance at the weld position is constrained to follow a predetermined function during weld nugget formation. This function is experimentally determined prior to welding and is programmed into the welding machine. The Van Sciver machine generates a function signal related to the above-mentioned predetermined function, compares the function signal to a signal related to the contact resistance, detects the error between them and then varies the heat input to minimize the error.

However, the Van Sciver device is sharply limited in its use due to the type of components and circuitry used therein. It has been found that a device built according to the Van Sciver patent requires the services of an engineer with an oscilloscope to set it up and it was usually necessary to repeat the set-up at frequent intervals, often daily, due to the tube drift and various other instabilities in the circuitry.

It is therefore an object of this invention to provide apparatus for use with a resistance welding machine and operable in conjunction with the weld timer of such machine for terminating the weld interval in response to a preselected resistance drop at the weld position.

A further object is to provide an apparatus, as aforesaid, particularly adapted and intended for use with the circuit of copending application Ser. No. 650,714 which circuit generates a signal proportional to the instantaneous contact resistance at the welding position during welding and with further circuitry as disclosed in copending application Ser. No. 650,964 intended for constraining the heat applied to the workpiece so that the instantaneous contact resistance will follow a preselected resistance function, said copending applications both being assigned to the assignee of the present invention.

A further object is to provide an apparatus, as aforesaid, which includes a highly stable and precise end ratio detector for reliably signaling when the contact resistance has fallen to a preselected fraction of its peak value corresponding to completion of fusion and the output signal of which is synchronized with the welding current waveform to insure that a whole number of cycles of welding current are applied to the workpiece.

A further object is to provide an apparatus, as aforesaid, in which the determination that the weld contact resistance has reached the predetermined fraction of its peak value is not affected by initial contact resistance transients occurring in the initial portion of the weld interval.

A further object is to provide an apparatus, as aforesaid, in which weld current will flow for the minimum time required for a satisfactory weld despite premature drops in resistance by said preselected fraction prior to normal fusion as a result of metal fit-up deficiencies.

A further object is to provide an apparatus, as aforesaid, in which the weld interval may be terminated alternatively upon said preselected fractional drop in the weld contact resistance as a result of completion of fusion upon normal timing out of the weld timer and in the latter case to provide an alarm to indicate a possible defective weld.

A further object of this invention is to provide an apparatus, as aforesaid, which is highly stable in operation, which is insensitive to changes in its operating environment, which will operate for long periods without adjustment, which can be readily and relatively inexpensively manufactured from standard components and compactly packaged, which is adaptable for use with a variety of welding machines and which is capable of a long and trouble-free service life with little or no maintenance.

Other objects and purposes of this invention will be apparent to persons acquainted with apparatus of this general type upon reading the following description and inspecting the following drawings.

BRIEF DESCRIPTION OF THE DRAWINGS

FIG. 3 illustrates diagrams disclosing waveforms found in the circuit of FIG. 2.

FIG. 4 is a schematic diagram disclosing the end ratio detector, end weld circuit and quality indicator portions of the circuit of FIG. 1.

Figure 1:
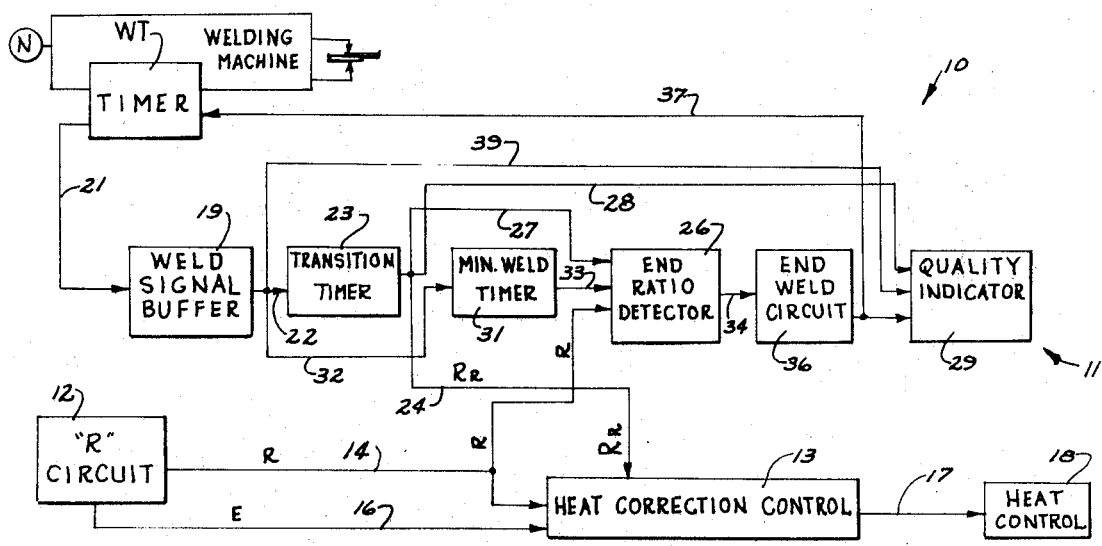
FIG. 1 is a block diagram of a feedback resistance drop circuit embodying the present invention.

Certain terminology will be used in the following description for convenience and reference only and will not be limiting. The words "upwardly," "downwardly," "rightwardly," and "leftwardly" will refer to directions in the drawings referred to. Such terminology will include the words above specifically mentioned, derivatives thereof and words of similar import.

SUMMARY OF THE INVENTION

In general, the objects and principles of this invention are met by providing a resistance drop feedback welding heat control circuit of the type providing a signal related in amplitude to the instantaneous welding contact resistance and which is capable of constraining the contact resistance to follow closely a preselected resistance function, which control circuit more particularly includes apparatus operable in conjunction with the weld timer of the resistance welding machine for terminating the weld interval before the normal fixed end point thereof in response to a drop of the contact resistance to a preselected fraction of its peak value corresponding to the completion of fusion. An end ratio device is responsive, when energized, to a drop of the contact resistance to a preselected fraction of a prior peak value for producing an end ratio signal. An end weld circuit responds to the end ratio signal causing the weld timer to terminate the weld interval. A buffer circuit is responsive to said weld timer for providing an energizing signal at the beginning of the weld interval. A transition timer is interposed between the buffer and the end ratio detector and responds to the buffer signal for energizing end ratio detector after a delay sufficient to allow termination of resistance instabilities associated with the initiation of welding.

A minimum weld timer is preferably provided and is energized by the buffer for preventing a spurious drop in welding resistance from triggering the end ratio signal until time minimally sufficient for satisfactory weld has passed. Means are provided for synchronizing the appearance of the end ratio signal with the alternating source energizing the welding machine so as to provide a whole number of welding current cycles in the weld interval. A quality indicator is preferably provided which provides an alarm to indicate the possibility of a defective weld unless energized by the end weld circuit prior to normal termination of the weld interval by the weld timer.

DETAILED DESCRIPTION

FIG. 1 discloses a feedback resistance drop welding control 10 embodying the invention. The feedback control 10 includes an end weld control 11 more particularly embodying the present invention and which is cooperatively connected to the welding timer WT of the resistance welding machine not shown and to be controlled. The feedback control 10 further includes a contact resistance generator circuit 12 preferably of the type disclosed in copending application Ser. No. 650,714. In addition, the control 10 includes a heat correction control circuit 13 preferably of the type disclosed in copending application Ser. No. 650,964 aforementioned. The heat correction control 13 is supplied with a resistance signal R, proportional to the instantaneous contact resistance at the welding position, through a line 14 and with a signal E proportional to the magnitude of the welding electrode voltage, preferably sampled at the amplitude peak of each welding current half cycle and supplied from the resistance signal generator 12 through a line 16. The heat correction control 13 compares the resistance signal R with a preselected function which the contact resistance is to follow and through a line 17 to a heat control 18 of any conventional type associated with the resistance welding machine, regulates said heat control and thence the rate of change of contact resistance through variation of the welding current amplitude.

In brief, the end weld control 11 comprises a weld signal buffer circuit 19 provided with a signal FIG. 3B from the weld timer WT through a line 21. Such signal lasts from the beginning of the weld interval until the weld interval is terminated, either after a preselected time period, timed by any conventional means in the weld timer, usually a timing capacitor as in copending application Ser. No. 396,727 assigned to the assignee of the present invention, or by the end weld control 11 as hereinafter described. The weld signal buffer 19 provides an output signal (FIG. 3C) on line 21 coextensive in time with the weld time signal from the timer WT and acts to isolate the timer WT from the end weld control 11 to avoid loading the timer output. The buffer signal (FIG. 3C) from the weld signal buffer 19 is applied through a line 22 to the input of a transition timer 23.

The transition timer 23 times a delay beginning with with the weld interval, and hereinafter referred to as the transition time, during which the contact resistance is likely to be unstable and subject to erratic variations due, for example, to surface irregularities, electrode heating and so forth. The transition timer 23 provides two output signals. The first, here designated the plus transition signal (FIG. 3D), coincides with the transition time. The second signal, here designated the minus transition signal, appears upon cessation of the plus transition signal and continues until the weld interval is terminated. The plus and minus transition signals (FIGS. 3D and 3E, respectively), are here positive D.C. potentials. These transition signals are applied through suitable respective conductors, generally indicated by a line 24 in FIG. 1, to the heat correction control 13 to prevent storage of the peak value of the contact resistance signal R until after the stabilization of the welding contact resistance.

The end weld control 11 further includes an end ratio detector 26. The R signal on line 14, proportional to the instantaneous weld contact resistance, is applied to the end ratio detector 26. The end ratio detector 26 normally determines when the weld resistance has dropped to a specified fraction of its peak value. Broadly speaking, the end ratio detector 26 functions by storing the peak value of the contact resistance signal R and then determining when the instantaneous value of the resistance signal R has fallen by a predetermined fraction from the peak value stored. The minus transition signal is applied through a line 27 from the transition timer 23 to the end ratio detector 26 to prevent the end ratio detector from registering a peak value of the signal R during the initial weld resistance instabilities normally expected during the transition time.

The transition timer, during the transition time, applies the positive transition signal to a quality indicator 29 through a line 28 as described hereinafter.

The end weld control 11 further includes a minimum weld timer 31 actuated through a line 32 by the output buffer signal from the weld signal buffer 19. The minimum weld timer provides a minimum weld signal (FIG. 3F) to the end ratio detector 26. The minimum weld signal does not prevent the end ratio detector 26 from storing the peak value of the resistance signal R but only prevents an output signal by the end ratio detector until after a preset portion of the weld interval has passed, that portion being designated the minimum weld time and being equal to the minimum time normally required to achieve a satisfactory weld. The minimum weld timer prevents false end ratio detector outputs where faulty metal fit-up deficiencies cause a spurious large fractional drop in the resistance signal R before sufficient time has passed to allow a satisfactory weld. In addition, the minimum weld timer 31 is synchronized with the alternating power line supplying the welding machine so as to permit an output from the end ratio detector only at the end of the whole number of cycles of weld current. One benefit of such an arrangement is to avoid saturation of the welding transformer.

Output from the end ratio detector 26 energizes, through a line 34, and end weld circuit 36. The end weld circuit 36, on energization, causes, through a line 37, the welding timer WT to immediately terminate the weld time if it has not already timed out.

The end weld circuit also couples to the quality indicator 29 through a line 38, the quality indicator 29 also being energized by the buffer signal through a line 39 and as aforementioned by the plus transition signal through line 28. The quality indicator energizes a suitable alarm for warning the machine operator that the resistance signal R did not fall to the preselected fraction of its peak value, as on completion of a satisfactory weld, before weld current was shut off at the end of the normal maximum welding interval by timing out of the weld timer WT. On the other hand, the quality indicator 26 provides no alarm when an output from the end ratio detector occurs prior to normal timing out of the weld timer WT, indicating that the contact resistance has fallen to the preselected fraction of its peak resistance value and thus indicating completion of a satisfactory weld.

Figure 2:
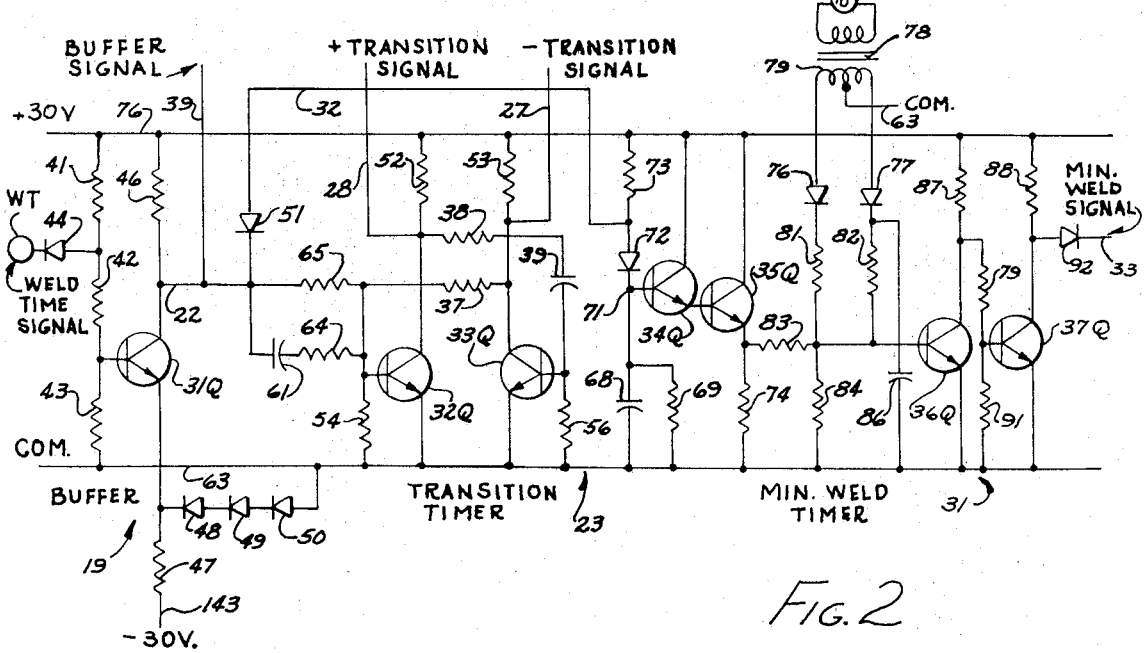
FIG. 2 is a schematic diagram indicating the buffer, transition timer and minimum weld timer portions of the circuit of FIG. 1.

Turning now to the specific circuitry of the end weld control 11, attention is first directed to FIG. 2. The buffer 19 comprises a transistor 13Q arranged in a simple amplifier or switching circuit to isolate the circuitry of the timer WT from the remainder of the end weld control 11 to avoid loading said welding timer. The particular buffer circuit 19 shown is arranged to operate with a welding timer having a normal low output voltage which increases to a substantial positive voltage, for example 20 volts, during weld time. The buffer circuit 19 includes a voltage divider comprising resistive elements 41, 42 and 43 in series connection from a positive potential line 76 to a common potential line 63, the positive potential line being, in the particular embodiment shown, 30 volts above the common line 63. The output of the welding timer WT is coupled through a clamping diode 44 to a point on the voltage divider intermediate resistors 41 and 42. The base of transistor 31Q connects between resistors 42 and 43. Thus, the low potential output of the timer WT at rest clamps the upper end of the resistor 42 and, hence, the base of transistor 31Q at a low potential thereby preventing conduction of transistor 31Q. On the other hand, during the weld interval, the weld signal rises to a high potential and the resistor 42 is unclamped whereby the voltage divider 41, 42, 43 biases the base of transistor 31Q at a potential high enough for conduction.

The collector and emitter of transistor 31Q are connected through resistance 46 and 47, respectively, to the positive potential line 76 and to a negative potential line 143 here held by any convenient means at 30 volts below common line 63. The emitter of transistor 31Q is clamped at or above a voltage level somewhat below the potential of the common line 63 by a series string of diodes, here three in number, indicated at 48, 49 and 50 and connected between the common line and the emitter of transistor 31Q. Thus, during the weld interval the transistor 31Q conducts and its collector potential is reduced below the potential of the common line 63 and this lowered potential appears on line 22 connected to the transistor collector as the buffer signal (FIG. 3C). The buffer signal is also applied through line 32 to the minimum weld timer 31. The line 32 includes an isolating diode 51, to allow the low potential buffer signal to be applied to the minimum weld timer but to prevent the minimum weld timer from drawing current from the buffer when transistor 31Q is nonconductive. The buffer signal is also applied to line 39 leading to the quality indicator 29.

Transition timer 23 comprises a pair of transistors 32Q and 33Q conected as a one-shot multivibrator circuit. More particularly, transistors 32Q and 33Q are connected at their emitters directly to common line 63, at their collectors through respective dropping resistors 52 and 53 to the positive potentail line 76 and receive base bias through respective resistances 54 and 56 from the common line 63. The base of leading transistor 32Q is coupled through a resistor 57 to the collector of transistor 33Q and the base of the latter is coupled to the collector of the former through a series resistor 38 and capacitor 59. A network comprising a series capacitor 61 and resistance 64 in parallel with a further resistance 65 connects the base of the leading transistor 32Q to the output line 22 of the buffer circuit 19. The plus transition signal and the minus transition signal are taken from the collectors of transistors 32Q and 33Q through lines 28 and 27, respectively.

The minimum weld timer 31 includes a timing capacitor 68 connected in parallel with a load resistor 69 between the common line 63 and a junction point 71 which in turn is connected through an isolating diode 72 and series resistance 73 to the positive potential line 76. The buffer signal is applied to the minimum weld timer 31 at a point between the resistor 73 and diode 72. The diode 72 is oriented to allow charging of the capacitor 68 through the resistor 73 but to prevent discharge of the capacitor 68 therethrough upon occurrence of a low potential on line 32.

The minimum weld timer 31 further includes a buffer circuit, comprising cascaded emitter follower transistors 34Q and 35Q, which applies the voltage on the capacitor 68 to a trigger circuit comprising transistors 36Q and 37Q while preventing such trigger circuit from draining the charge from the capacitors 68. In the buffer circuit here shown, the collectors of transistors 34Q and 35Q directly connect to the positive potential line 76, base input for transistor 35Q is taken directly from the emitter of transistor 34Q and base input for transistor 34Q is obtained directly from capacitor 68 by connection to the junction point 71. An emitter resistor 74 connects the emitter of transistor 35Q to the common line 63.

The minimum weld timer 31 is also driven by a full wave rectified alternating supply voltage. Thus, an alternating source preferably that feeding the welding machine and at least in phase with the weld current controlled thereby causes current flow through rectifying diodes 76 and 77 on alternate half cycles of the source S. For purposes of illustration, the source S is shown to drive a conventional transformer 78 having a center tapped secondary winding 79, the center tap of which is connected to common line 63 and the ends of which are connected to the anodes of respective diodes 76 and 77 for alternatively causing current flow therethrough. The cathodes of diodes 76 and 77 connect to the base of trigger transistor 36Q through resistors 81 and 82 while the emitter of output buffer transistor 35Q connects to said base through a further resistor 83. Base bias is furnished to transistor 36Q through a bias resistor 84 from the common line 63. Thus, the sum of the buffered positive voltage on capacitor 68 and the full wave rectified alternating voltage from diodes 76 and 77 appears on the base of transistor 36Q.

A capacitor 86 connects between the cathode of diode 77 and the common line 63. The capacitor 86 charges during conduction through the diode 77 sufficiently to maintain the base of transistor 36Q positive, and thereby conductive, at that point in the phase of source S. Diode 77 remains conductive until the diode 73 commences conduction for energizing said transistors 36Q. The capacitor 86 discharges during the succeeding half cycle of conduction (by the diode 76) through resistor 82 and the conductive transistor 36Q. Thus, the only time in a given cycle of the supply S at which the transistor 36Q is nonconductive for lack of positive bias is that point at which conduction through diode 76 has just ceased and conduction through diode 77 is about to begin, capacitor 68 being discharged. Connection of the rectifiers 76, 77 to the source S is made so that initiation of conduction through diode 77 corresponds to the zero degree point in the welding current waveform. Thus, the transistor 36Q can be made conductive only after a whole number of full cycles of weld current have occurred in the weld interval.

Trigger circuit transistors 36Q and 37Q are directly connected at their emitters to the common potential line 63 and at their collectors through dropping resistors 87 and 88 to the positive potential line 76. The base of transistor 37Q is energized from the collector of transistor 36Q through a resistor 79, base bias being supplied to transistor 37Q through a further resistor 91 from common line 63. The minimum weld signal (FIG. 3F) is taken from the collector of trigger transistor 37Q through a diode 92 on line 33 and applied, as hereinafter described, to the end ratio detector circuit 26. The minimum weld signal consists of a positive D.C. potential interrupted, after the minimum weld time (i.e., the discharge time of capacitor 68), by negative going spikes dropping to essentially the common potential when conductive bias is removed from transistor 36Q as above described and, hence, occurring at the zero degree points in the weld current waveform.

The end ratio detector 26 (FIG. 4) includes a unijunction transistor 38Q, the lower base of which directly connects to the common line 63. The emitter circuit of the unijunction 38Q includes a series resistive voltage divider comprising a resistor 93, a potentiometer 94 and a further resistor 96 connected between the resistance signal line 14 from the R circuit 12 (FIG. 1) and the common line 63. Thus, a potential proportional to the contact resistance signal R appears on the wiper of the potentiometer 94 and is impressed through a diode 97 on the emitter of unijunction 38Q. In the preferred embodiment shown, the resistance signal R is a positive voltage and the diode 97 is thus oriented with its cathode toward the unijunction. The emitter of unijunction transistor 38Q is also connected to the minus transition line 27 through a series diode 98 and resistor 99. The diode 98 is oriented with its anode toward the unijunction 38Q to clamp the emitter thereof essentially at common potential during the transition time before the minus transition signal, which as seen in FIG. 3E is a positive D.C. potential, appears. Thus, during the transition time, the emitter of unijunction 38Q is clamped at a low voltage and cannot follow the resistance signal R as it rises.

A peak resistance signal storage capacitor 101 has its upper plate connected to the emitter of unijunction 38Q to be charged to whatever voltage appears thereon. Thus, the capacitor 101 remains essentially uncharged during the transition time but thereafter is charged in proportion to the contact resistance signal R as it rises, the upper plate of such capacitor then carrying the rising potential on the wiper of potentiometer 94. The diode 97 allows the capacitor charge to follow the resistance signal R as it rises but prevents the capacitor from discharging through the potentiometer 94 when the resistance signal R begins to drop. Thus, the capacitor 101 stores the portion of the peak value of the resistance signal R appearing on the wiper of potentiometer 94.

The other or lower end of the capacitor 101 connects to the base of a transistor 39Q. Transistor 39Q has its emitter directly connected to the common line 63 and its collector connected through a suitable dropping resistance 106 to the positive potential line 76. Transistor 39Q is normally biased for conduction by connection of its base through a resistor 102 to the positive potential line 76 so that the lower plate of the capacitor 101 is normally shorted thereby to the common potential line 63.

The resistance signal line 15 and the minimum weld signal line 43 connect to the upper base of the unijunction transistor 38Q through respective diodes 103 and 104 which are oriented with their cathodes toward the unijunction transistor. The diodes 103 and 104 apply the one of the resistance signal R and minimum weld signal which is the highest in potential at any given instance to the upper base of unijunction 38Q. Said diodes also isolate the resistance signal generator R and minimum weld timer from each other and from unwanted positive potentials from the end ratio detector. The output of the end ratio detector appears as a negative spike pulse applied to the base of transistor 39Q for turning same off when the unijunction 38Q fires. The unijunction fires in response to the combination of a charge on capacitor 101 corresponding to peaking of the resistance signal R, a drop of the resistance signal R to or below a preselected fraction of that peak value and a negative going spike pulse from the minimum weld timer, as hereinafter discussed in the operation portion of the specification.

The end weld circuit 36 comprises transistors 40Q and 41Q which are connected in a one-shot multivibrator circuit. The emitters of transistors 40Q and 41Q connect directly to the common line 63 and the collectors thereof connect through respective dropping resistors 107 and 108 to the positive potential line 76. Base bias is supplied to the transistors 40Q and 41Q through resistors 111 and 112, respectively. Transistor 40Q is normally nonconductive. The collector potential of transistor 40Q is applied to the base of transistor 41Q through a resistor 113 to cause the transistor 41Q to fall nonconductive when transistor 40Q starts to conduct. The collector of transistor 41Q connects through a series resistor 114 and capacitor 116 with the base of transistor 40Q. A high collector potential on transistor 41Q charges the capacitor 116 at a rate fixed by the value of resistor 114, and thereby maintains the base of transistor 40Q above cutoff potential. Thus, the transistor 40Q is conductive until the capacitor 116 charges.

The one-shot multivibrator circuit 40Q, 41Q is energized through a resistor 117 connected between the collector of transistor 39Q and the base of transistor 40Q when the end ratio occurs and causes the transistor 39Q to fall momentarily nonconductive. The end weld circuit, when energized, provides a first output to the line 37 leading to the welding timer WT as stated above with respect to FIG. 1. The line 37 in FIG. 1 represents a pair of conductors 37a and 37b in FIG. 4. The conductor 37a connects through an isolating diode 118 to the collector of transistor 40Q, the diode 118 being oriented to allow conventional current flow from the weld timer through the transistor 40Q when the latter is conductive. The conductor 37a is connected to the weld timer WT in any convenient manner, not shown, for causing same to index from the weld interval into the next function interval for which it is programmed, usually the hold interval, by applying common potential thereto on conduction of transistor 40Q. On the other hand, conductor 37b from the weld timer connects to the collector of transistor 40Q through a series network comprising a diode 119, a resistor 121 and a further diode 122. The conductor 37b is intended to connect to the timing capacitor, not shown, normally provided in conventional weld timers to discharge same through the series network 119, 121 and 122 when the transistor 40Q becomes conductive. Although the end weld circuit provides outputs on lines 37a and 37b particularly adapted to control of weld timers of the kind disclosed in copending application Ser. No. 369,727 assigned to the assignee of the present invention, it will be apparent that the present circuit is not intended to be limited to such type of weld timer only. A further resistor 123 preferably connects from the positive potential line 76 to a point between diode 119 and resistance 121 for limiting the extent to which conduction to transistor 40Q can drop the potential on line 37b and, hence, on the timing capacitor to limit the discharge of said capacitor to a preselected level.

The end weld circuit 29 provides a further output from the collector of transistor 41Q through a resistor 124 to the base of transistor 42Q in the quality indicator 29. The quality indicator circuit 29 includes a flip-flop circuit comprising transistors 42Q and 43Q. Transistors 42Q and 43Q have emitters directly connected to the common line 63 and collectors connected through dropping resistors 126 and 127, respectively, to the positive potential line 76. Base bias is applied to transistors 42Q and 43Q through suitable resistors 128 and 129, respectively. The transistors 42Q and 43Q are connected base to collector with each other through corresponding resistors 131 and 132 to maintain same in opposite states of conduction in a conventional manner. The line 28 from the transition timer 23 upon which the plus transition signal appears during the transition time is impressed through a resistor 133 onto the base of transistor 43Q to render it conductive until turned off by conduction of the transistor 42Q as a result of occurrence of the end ratio or, should that not occur before the end of the weld interval by a subsequent resetting of the flip-flop as hereinafter described.

A resistive voltage divider comprising series resistors 137, 138 and 139 extends between the positive potential line 76 and the common line 63. A transistor 44Q connects at its base between the divider resistors 138 and 139, the divider 137, 138, 139 normally biasing same for conduction. A diode 134 connects the collector of transistor 42Q to a junction point 136 near the positive potential end of said voltage divider. The output line 39 from the buffer circuit 19 connects through a diode 141 to the same junction point 136. The diodes 134 and 141 define an OR gate whereby a low potential on line 39, i.e., the buffer signal, or on the collector of transistor 42Q will clamp the junction point 136 and therefore the base of transistor 44Q at a low potential to prevent conduction of said transistor.

The emitter of transistor 44Q connects to the common line 63 and its collector connects to a positive potential source 145 through a parallel load network for energizing same upon conduction of transistor 44Q. Said network preferably comprises a suitable "no weld" alarm 142 such as a lamp or other indicating device and any other desired means, for example, suitable relays 144 for resetting portions of the welding machine, adjusting workflow therepast or the like.

A reset circuit 146 is provided for turning of the transistor 44Q and its alarm network by resetting the flip-flop circuit 42Q, 43Q of the quality indicator. The flip-flop 42Q, 43Q is reset by applying a positive potential to the base of transistor 42Q to render same conductive; this conduction in turn clamps the base of transistor 44Q to de-energize the alarm network 142, 144. The reset circuitry in the particular embodiment shown includes a manual reset portion including a manual reset switch 147 disposed between the positive supply 76 and the reset line 148 and manually closable to impress a positive potential on the transistor 42Q to reset the quality indicator as above described. An isolating diode 149 is placed between the manual reset portion and the positive supply line 76. Further, filter networks 151 and 152 are placed on either side of the manual reset switch 147 to prevent switching transients from being placed upon the positive supply line 76 or the reset line 148. Each network 151 and 152 here comprises a pair of resistors 153 and 154 in series with the reset switch 147 and a filter capacitor 156 connected between the resistors 153 and 154 and the common line 63.

The reset circuit, in the particular embodiment shown, further includes an automatic portion comprising a series capacitor 157 and resistor 158 connected between the negative voltage supply 143 and a series resistor 159 and isolating diode 161 link to the reset line 148. A normally closed switch contact 162 is connected across the capacitor 157 and resistor 158 to maintain the capacitor 157 discharged. A charging circuit for the capacitor 157 comprises a resistor 163 and potentiometer 164 connected in series with a manual switch 166, which is closed when it is desired for the automatic portion of the reset circuit 146 to be operable, and a further switch contact 167 series between the positive potential line 76 and the upper end of resistance 158. The switch contact 167 is normally open and the contacts 162 and 167 are preferably switched from their normal states upon energization of one of the relays 144. Upon such reversal, the contact 162 no longer shorts the capacitor 157 and contact 167 supplies charging potential to the capacitor 157 from the positive supply line 76 at a rate determined by the setting of reset potentiometer 164. In addition, a line 168, including a D.C. blocking capacitor 169, connects between the resistors 158 and 159 to apply a series of positive pulses thereto from any convenient source. In the particular embodiment shown, the pulse train is preferably the swamping pulse train appearing on the collector of transistor 6Q of the aforementioned copending application Ser. No. 650,714 at the beginning of each cycle of weld current. As a result, once the capacitor 157 has charged sufficiently through the reset potentiometer 164, the positive pulses transmitted through capacitor 169 are elevated sufficiently in potential to pass diode 161 and appear on the base of transistor 42Q. Transistor 42Q then fires, shutting off transistor 43Q and the alarm means 142 and relay means 144. The quality indicator is thus reset for a further weld interval.

OPERATION

Although the broad operation of the present circuit has been indicated generally above with respect to the description of FIG. 1 and details thereof have been given in the description of the specific circuitry of FIGS. 2 and 4, the operation of the circuit will now be reviewed to insure a complete understanding of the invention.

Considering FIG. 2 then, the signal impressed by the weld timer WT on the diode 44 is normally a very low D.C. voltage which switches to a positive voltage (for example, about 20 volts) at the beginning of the weld interval and remains so during the weld interval. This weld time signal is allowed to drive the base of transistor 31Q so that the collector voltage thereof will normally be high and will switch to a slightly negative value during the weld time. This slightly negative value is referred to as the weld buffer signal (FIG. 3C).

As has been mentioned, the weld resistance cannot be depended upon for the first one or two cycles of weld time as surface irregularities, electrode seating, etc. are having effect and unpredictable signal variations may occur. For this reason, the transition timer circuit 23 is used to "blank out" the first few cycles of weld time from consideration by the control system 10.

Prior to the weld interval, the bases of both transistors 32Q and 33Q of the "one-shot" multivibrator circuit are driven by the buffer signal so that both transistors conduct. When weld interval starts, the D.C. base drive is removed by conduction of transistor 31Q and transistor 32Q is cut off by capacitive coupling from the collector circuit of transistor Q31 so that transistor 33Q will continue to conduct for a period defining the transition time. Some time later (e.g., approximately three cycles), determined by circuit constants, the circuit will switch to a stable state with transistor 32Q conducting and transistor 33Q cut off, thereby ending transition time. The net result is that the collector voltage of transistor 32Q is low at rest, high for transition time, and low for the remainder of weld interval and provides the positive transition signal. In addition, the collector voltage of transistor 33Q is low at rest, low for transition time, and high for the remainder of weld time and provides the negative transition signal.

It is sometimes possible, during a weld, for the weld resistance signal to behave erratically for the first few cycles of weld time. This condition is normally compensated for by the transition timer. It occasionally occurs, however, that a weld condition might be such as to cause premature drop in the resistance signal R (mostly due to metal fit-up problems) which cannot be corrected by the heat correction control 13 (FIG. 1). It has been found experimentally that such conditions almost always correct themselves early in the weld time. It has further been determined experimentally that the system of weld control provides maximum advantage over conventional weld control when the weld interval is other than very short. It has been concluded that there is an advantage in preventing the time termination of a weld at a weld time below some minimum value to allow metal fit-up problems to correct themselves since this required minimum time period of welding will probably be less than the minimum practical controlled weld time. For these reasons, the minimum weld timer 31 has been incorporated into the circuitry 11. This minimum weld timer does not prevent the storage of the peak value of weld resistance R in the end ratio detector 26; it merely prevents the generation of an output signal prior to the minimum weld time. This circuit also serves another purpose. It is desirable that "lead-trail" firing of the ignitron contactor, not shown, of the welding machine (as shown, for example, in the afore-mentioned application Ser. No. 650,714 be preserved to insure a whole number of cycles of weld current through the welding transformer to prevent saturation of the transformer iron. The synchronizing circuitry including diodes 76 and 77 is combined with the minimum weld timer 31 to achieve this end.

The timing capacitor 68, unclamped by the weld buffer circuit 19 at rest (i.e., other than during the weld interval), is allowed to charge. The potential at the lower end of resistor 73 is clamped low by weld buffer transistor 31Q conduction during weld time so that the timing capacitor 68 is allowed to discharge through its load resistor 69. The voltage across this capacitor is buffered out by transistors 34Q and 35Q to drive transistor 36Q.

Because transistors 36Q and 37Q are connected in a trigger circuit, the drive (derived from the charge on the timing capacitor 68) to transistor 36Q causes transistor 37Q to cut off so that its collector circuit will, in turn, provide a voltage, the minimum weld signal, to the end ratio detector 26 which prevents an output from the end ratio detector. Eventually, the charge on timing capacitor 68 will bleed off to the point where the end ratio detector will be allowed to operate.

The transistor 36Q of minimum weld timer is also driven by the full wave rectified A.C. voltage from the supply S so that transistor 37Q can conduct only at the zero and 180 degree points on the voltage wave. Also, there is capacitive filtering applied by the capacitor 86 to the first half cycle of rectified supply voltage so that transistor 37Q cannot conduct at the 180 degree point of the supply waveform. The effect of this circuitry is that 37Q can conduct only at the zero degree point on the line voltage wave (the end of any particular line voltage cycle). It will be recalled that the end ratio detector 36 can function only when transistor 37Q conducts; thus the end ratio detector must function at the end of a line voltage cycle or not at all. In this manner, the termination of weld time is achieved "synchronously" with the line and with the weld current which the line supplies.

It is the function of the end ratio detector to detect the occurrence of the "end ratio." The end ratio is defined as that state of affairs wherein the ratio of the weld resistance to the peak weld resistance has decreased to some particular ratio. For example, at the highest value of weld resistance, early in the weld time, the ratio is 1. Later in the weld time, when the weld resistance has decreased 20 percent, the ratio is .8. The end ratio is that ratio at which a good weld has been made. This is normally in the .75 to .85 range.

The weld resistance signal R is applied to the "percent change" potentiometer 94 and a portion of the resistance signal R is applied through the diode 97 to the storage capacitor 101 which stores this value and applies it to the emitter of the unijunction transistor 38Q. Due to the action of the diode 97, the emitter signal will be proportional to the highest value of contact resistance reached during the weld period. (The storage capacitor is reset to a condition of discharge through 33Q during transition time at the beginning of each weld.)

The instantaneous weld resistance signal R is also applied to the base 2 electrode (i.e., the upper base) of the unijunction transistor 38Q during each negative spike of the minimum weld signal.

With the stored portion of the highest value of weld resistance signal impressed on its emitter and the (eventually) decreasing value of weld resistance signal R impressed on its base 2, the unijunction transistor 38Q will conduct when the ratio of actual weld resistance to peak weld resistance decreases to a certain value.

The condition for firing a unijunction transistor is:

$$Ve \geq nBb2$$

where $Ve$ is the voltage impressed between the emitter and base 1, $n$ is the intrinsic stand-off ratio of the transistor (a constant), and $Vb2$ is the voltage impressed between base 1 and base 2.

This equation may be rewritten:

$$nVb \leq Ve$$

Due to circuit considerations, $$Ve = K1Rp$$

Where $K1$ is the potentiometer setting and $Rp$ is the highest value reached by the weld resistance signal, and:

$$Vb2 = R$$

Therefore:

$$nR \leq K1Rp$$

and if, $$K2 = K1/n$$

then:

$$R \leq K2Rp \text{ and } R/Rp \leq K2$$

showing that the unijunction 38Q will conduct when the ratio of instantaneous weld resistance to highest weld resistance has decreased to a value set by the potentiometer 94.

Conduction of unijunction 38Q discharges the storage capacitor and couples a negative pulse to the base of transistor 39Q causing same to cut off.

During the weld interval, transistor 41Q of the "one-shot" circuit 40Q, 41Q is normally conductive. As stated, operation of the end ratio detector causes transistor 39Q to cut off. The resulting high collector potential on transistor 39Q turns on transistor 40Q and cuts off transistor 41Q for a short pulse period determined by the time constant of the circuit. Conduction of transistor 40Q places a momentary short circuit from conductor 37a to common line 63 which causes the weld timer WT to index from weld time into hold time. Also, conductor 37b is momentarily short circuited to common to discharge the customary timing capacitor, not shown, in the timer WT to prepare it for the charging for hold timing. This short circuit condition on conductor 37b lasts for only a few milliseconds so that there is no interference with the hold timing function in the weld timer WT.

The above discussion has assumed the end ratio to be reached, indicating completion of a good weld, before the weld timer completes its timing of the preset weld interval, here the maximum time allotted for a weld. On the other hand, it is desirable that an indication be provided when the desired weld resistance drop does not occur during the allotted weld interval. Practically, the weld interval cannot be allowed to continue without limit so some maximum limit must be set by the weld timer. Thus, should the welding machine be unable to produce a good weld within this maximum time, the machine operator should be so informed that corrective action can be taken. For this reason, the quality indicator circuit 29 has been included to indicate that a weld has not been completed in the weld interval.

Transistor 42Q of the flip-flop circuit of the quality indicator 29 is normally conductive. When weld interval starts, the positive transition time signal drives transistor 43Q conductive causing transistor 42Q to turn off. Thereafter the positive going end ratio signal from the collector of transistor 41Q will turn on transistor 42Q to cut off transistor 43Q if a good weld is made. If a good weld is not made, no end weld signal appears and transistor 43Q will remain conductive after the weld timer WT ends the weld interval.

Transistor 44Q is normally not conductive at rest because its base drive is clamped by conduction of 42Q. Although transistor 42Q cuts off at the start of weld time, buffer transistor 31Q conducts to clamp the base drive to transistor 44Q for maintaining same nonconductive. If a good weld is made, 42Q will thereafter conduct and thereby maintain transistor 44Q off after the weld interval ends. On the other hand, if a good weld is not made, cessation of conduction (at the end of weld time) of buffer transistor 31Q will allow transistor 44Q to conduct. Conduction of transistor 44Q which indicates that a bad or questionable weld has been made, energizes suitable relays 144 to operate external and auxiliary circuits and the "no-weld" warning light 142 to signal the operator that the control system 10 is not able to guarantee the weld.

When transistor 43Q remains conducting after weld time, to signify a questionable weld, the indicating system 29 may be reset by causing transistor 42Q to conduct. This may be done by operating the reset push button 147 to provide momentary base drive to transistor 42Q or reset may be accomplished automatically. More particularly, operating of the indicating circuit 29 energizes relay 144 which by reversing the state of contacts 162 and 167 unclamps the charging circuits 166, 163, 164, 158 for the capacitor 157. As this capacitor is charged, the voltage across it eventually increases to reduce the reverse bins on the diode 149 in the drive line 148 for transistor 42Q. Capacitively coupled positive pulses from any convenient source, preferably from the swamping pulse circuit of copending application Ser. No. 650,714 from the collector circuit of 6Q are applied to the diode 161 so that when the capacitor voltage rises enough, the pulse voltage will pass the diode 161 to provide drive for transistor 42Q to reset the circuit.

Thus, the circuitry 11 described supplied with a signal R representing the instantaneous weld contact resistance provides a feedback control system to control weld time as a function of weld resistance drop. However, the circuitry 11 further is particularly adapted for use with the heat correction control 13 to control the weld current in such a manner that the weld time correction required to be provided by the present circuitry 11 is minimized.

Although a particular preferred embodiment of the invention has been described above for purposes of illustration, it will be apparent that modifications and variations within the scope of the appended claims are fully contemplated.

The embodiments of the invention in which an exclusive property or privilege is claimed are defined as follows:

1. In a resistance welding machine, a circuit for sensing the occurrence of the end ratio defining a predetermined fractional drop in the weld contact resistance from a prior peak value and comprising in combination:
   a unijunction transistor having base and emitter electrodes and means rendering said unijunction conductive in response to a preselected potential difference therebetween;
   proportioning means and means applying a resistance signal thereto, such resistance signal being proportional to the instantaneous contact resistance at the welding position, said proportioning means providing a preselected portion of said resistance signal;
   storage means connected to the emitter of said unijunction;
   unidirectional conductive means disposed between said proportioning means and said emitter for charging said storage means from said proportioning means as said resistance signal rises to a peak value, said unidirectional means blocking discharge of said storage means therethrough as said resistance signal falls;
   clamping means coupled to said storage means and means energizing same for preventing charging of said storage means during the initial portion of the weld interval when the weld resistance is unstable;
   means applying said resistance signal to a base of said unijunction transistor whereby said unijunction will fire and discharge said capacitor after a drop in said resistance signal to a preselected fraction thereof.

2. In a resistance welding machine, a circuit for sensing the occurrent of the end ratio defining a predetermined fractional drop in the weld contact resistance from a prior peak value and comprising in combination:
   a unijunction transistor;
   a resistance signal source for providing a resistance signal proportional to the instantaneous weld contact resistance;
   a manually adjustable potentiometer and means energizing same from said resistance signal source;
   a storage capacitor and an output device coupled thereto and responsive to discharge thereof for signaling the occurrence of said end ratio;
   a diode connecting the wiper of said potentiometer to the emitter end of said storage capacitor for charging same to a preselected portion of said resistance signal;
   a clamping diode connected to the emitter end of said timing capacitor and means energizing said clamping diode for clamping said capacitor at a low potential during the initial portion of the weld interval so as to prevent resistance signal transients from charging said capacitor sufficiently to fire said unijunction transistor;
   means coupling said resistance signal source to said unijunction transistor for placing said resistance signal across said unijunction, charging of said capacitor by peaking of said resistance signal causing said unijunction to fire in response to dropping of said resistance signal to a preselected fraction of its peak value and for discharging said capacitor therethrough.

3. The device defined in claim 2 including minimum weld means providing a steady positive output punctuated by a series of negative going pulses after the minimum portion of the weld interval required for a satisfactory weld has elapsed;

a gate comprising a first diode for connecting said resistance signal source to a base of said unijunction and a second diode for coupling said minimum weld means to said base, the cathodes of both such diodes being coupled to said base, said minimum weld means normally blocking said first diode so that a drop in said resistance signal to or beyond said desired fraction of said peak will not fire sand unijunction until a negative pulse from said minimum weld means unblocks said first diode.

4. The device defined in claim 3 in which said minimum weld signal means includes signal means providing a pulsating D.C. signal synchronized with the welding current, said pulsating D.C. signal synchronizing said negative pulses with the welding current to provide for firing of the unijunction transistor at the end of a whole number of complete weld current cycles.

References Cited

UNITED STATES PATENTS 2,848,595    8/1958    Van Sciver.

JOSEPH V. TRUHE, Primary Examiner

J. G. SMITH, Assistant Examiner

U.S. Cl. X.R.

219—109